(12) United States Patent
Duroj

(10) Patent No.: US 6,804,702 B2
(45) Date of Patent: Oct. 12, 2004

(54) VIRTUAL HARD DISC

(75) Inventor: Dani Duroj, Bandhagen (SE)

(73) Assignee: Creative Media Design at Integrated Systems Scandinavia Group AB, Bromma (SE)

( * ) Notice: Subject to any disclaimer, the term of this patent is extended or adjusted under 35 U.S.C. 154(b) by 484 days.

(21) Appl. No.: 10/000,387

(22) Filed: Nov. 30, 2001

(65) Prior Publication Data

US 2002/0087653 A1 Jul. 4, 2002

(30) Foreign Application Priority Data

Dec. 5, 2000 (SE) .............................................. 0004476

(51) Int. Cl.[7] ............................................ G06F 15/167
(52) U.S. Cl. ........................ 709/215; 711/153; 711/173; 709/219
(58) Field of Search .............................. 711/153, 173; 709/213, 219

(56) References Cited

U.S. PATENT DOCUMENTS 5,995,965 A * 11/1999 Experton ...................... 707/10
6,405,245 B1 * 6/2002 Burson et al. .............. 709/217
6,701,369 B1 * 3/2004 Philyaw ...................... 709/229

FOREIGN PATENT DOCUMENTS

WO          WO 00/43962          7/2000

* cited by examiner

*Primary Examiner*—Hiep T. Nguyen
(74) *Attorney, Agent, or Firm*—Ware, Fressola, Van Der Sluys & Adolphson LLP

(57) ABSTRACT

The invention relates to a handheld portable card or disc (22) interface to a crash secure virtual hard disc (24) accessed through the card or disc with software storage capability, and a system (20) therefore. It virtually allows a user to log in on any computer (28) or terminal for retrieving own computer files from the hard disc (22) through the world wide web or Intranet and the like.

12 Claims, 3 Drawing Sheets

VIRTUAL HARD DISC

TECHNICAL FIELD

The present invention pertains to a handheld portable crash secure virtual hard disc accessed through a card or disc with software storage capability, and a system therefore.

BACKGROUND

Computer hard discs are sensitive for crashing, and not being suitable to be handheld and for example stored in a pocket or wallet. A small hard disc to be carried by a person and used on any computer or computer terminal with comparable or transparent software would be appreciated by most computer users. Such a hard disc does not exist on the current market for computer hardware or software.

There exists portable hard disc equipment, but those are limited to be used on computers especially designed for such discs, for example, Bernouille discs. There also exists PCM-CIA memory cards which are small sized and fairly portable, but they can only be used on computers with slots for such cards.

A problem with today portable discs is that they are easily damaged, and when so it is probable that all information stored on them is lost, which of course is a disaster for a user.

Another problem consists in that known portable discs such as above can easily be stolen or lost.

Ordinary Compact Discs (CDs) used for carrying data from one computer to another are also easily lost or stolen, mostly due to their relatively large size.

The international patent application WO 00/43962 by Nakano et al discloses a method and an apparatus of providing secure transactions on a network. The teaching of WO/ 00/43962 is related to billing and how information could be downloaded to a smart card from a specific server. It is thus not related to transactions on a hard disc or how hard disc space is located to multiple users on one server or multiple servers connected at the same site.

SUMMARY OF THE DISCLOSED INVENTION

The present invention aims to solve problems related to hard discs of current design and use regarding features as being easily damaged, stolen, lost, crashed, handheld etc. It also enhances the speed of copying, pasting, drag-and-drop etc. between multiple hard discs.

In order to solve problems according to the above mentioned the present invention sets forth a virtual hard disc interface on a handheld portable card or disc, being crash secured and accessed through said card or disc with software storage capability. Hereby it comprises:
  a connection to one hard coded address domain server in a network for data and telecommunication;
  the domain server providing a plurality of virtual hard disc spaces;
  said domain server and one of said plurality of hard discs being reached from any host computer or terminal with a corresponding card or disc receiver through said hard coded address, whereby the card or disc provides a user personal hard disc to an arbitrary computer or terminal;
  file transfer protocol for copying or retrieving files between card or disc and a space in said virtual hard disc or vice versa;
  a graphical software representation of files in the virtual hard disc on the card or disc; and
  thereby providing the card having only one access path to the one domain server, thus providing a stationary user unchangeable portable hard disc, being crash secure, for example, through server backups.

In one embodiment of the invention it is accomplished that a useridentity and a password entered through the card or disc provides access to one of the plurality of hard disc spaces.

Another embodiment provides that drag and drop is used for adding files to the card or disc graphics.

In a further embodiment the card or disc provides that it can run on any computer or terminal with transparent software.

A still further embodiment provides that the space is made available to a user through drop and drag an icon/graphics onto the card or disc as a useridentity and password, whereby the icon/graphics pixels are matched to stored pixels on the card or disc for the graphic shown in the icon.

Another embodiment provides a data transfer between two hard discs in high-speed through a server internal transfer.

Furthermore, the present invention sets forth a system comprising a handheld portable card or disc with an interface to a crash secure virtual hard disc accessed through the card or disc with software storage capability. The system comprises:
  a hard coded address domain server in a network for data and telecommunication;
  a plurality of virtual hard disc spaces in the server;
  said domain server and one of said plurality of hard discs being reached from any host computer or terminal with a corresponding card or disc receiver through said hard coded address, whereby the card or disc provides a user personal hard disc to an arbitrary computer or terminal;
  a file transfer protocol for copying or retrieving files between card or disc and a space in the virtual hard disc or vice versa;
  a graphical software representation of files in the virtual hard disc on the card or disc:
  a temporary memory space in a host computer or terminal running the card or disc for processing the files; and
thereby providing the card or disc having only one access path to the one domain server, and thus comprising stationary user unchangeable portable hard discs, being crash secure, for example, through server backups.

One embodiment of the system provides that a useridentity and a password entered through the card or disc provides access to one of the plurality of hard disc spaces.

Another embodiment of the system provides that drag and drop is used for adding files to the card or disc graphics.

A further embodiment of the system provides that the card or disc is run on any computer or terminal with transparent software.

In a still further embodiment, the space is made available to a user through drop and drag an icon/graphics onto the card or disc as a user identity and password, whereby the icon/graphics pixels are matched to stored pixels on the card or disc for the graphic shown in the icon.

Yet another embodiment provides a data transfer between two hard discs in highspeed through a server internal transfer.

BRIEF DESCRIPTION OF THE DRAWINGS

Henceforth reference is had to the accompanying drawings in conjunction with the description for a better understanding of the embodiments and examples described herein, whereby.

DETAILED DESCRIPTION OF PREFERRED EMBODIMENTS

The present invention provides a crash secure virtual hard disc. Thereby it provides an interface on a card or disc with software storage capabilities such as smart cards, CD-cards (size of credit cards or smaller), SIM cards for cellular communication, conventional CD discs could also be used but credit card sized are preferred. These cards are easily carried in a pocket or wallet. Suitable cards for this purpose are described in the international patent applications WO 00/41131 and WO 01/06342 both by Duroj.

Cards used in accordance with the present invention are hard coded with only one domain server address. This means that the card can be used only against a pre-selected server, i.e., a user cant store files anywhere else. Thus if a card is lost, stolen, damaged etc. a new card is easily bought in a closest shop or net-store and a connection to the same server can be maintained due to the hard coded one server address. A user has to enter his useridentity and password or PIN-codes. Hence, the card is personalized to the user, and a stolen card is invalid without knowing the identities for a connection to the domain server. It is crash secure in the sense of that there are advanced routines for backup at server sites.

The virtual hard disc in accordance with the present invention is accomplished by allowing every card user to have a memory space in the domain server connected to a card. The space is made available to a user by the user identity and password or other like entering codes. This provides an unique storage area for a users software files, i.e., a virtual hard disc. The meaning of virtual in this context is that the hard disc memory space is not comprised in the computer running a card, but through a network connection.

In one embodiment of the present invention the space is made available to a user through drop and drag an icon/graphics onto the card as a user identity and password. Thereby, the icon pixels are matched/compared to stored pixels on the card for the graphic shown in the icon. If the pixels that make up the drop and drag icon match the stored pixels for the graphics an access to the hard disc of the present invention is allowed. The pixels can be matched to allow access if a predetermined threshold for the match is reached. This approach could be favorable for kids as an access to a virtual hard disc.

Hence, with a card in accordance to the present invention a user can always connect to his/her hard disc where ever they are by using a computer or terminal with a connected card slot or CD player. Conventional CD players are equipped with a mini CD area of approximately 8 cm diameter.

Figure 1:
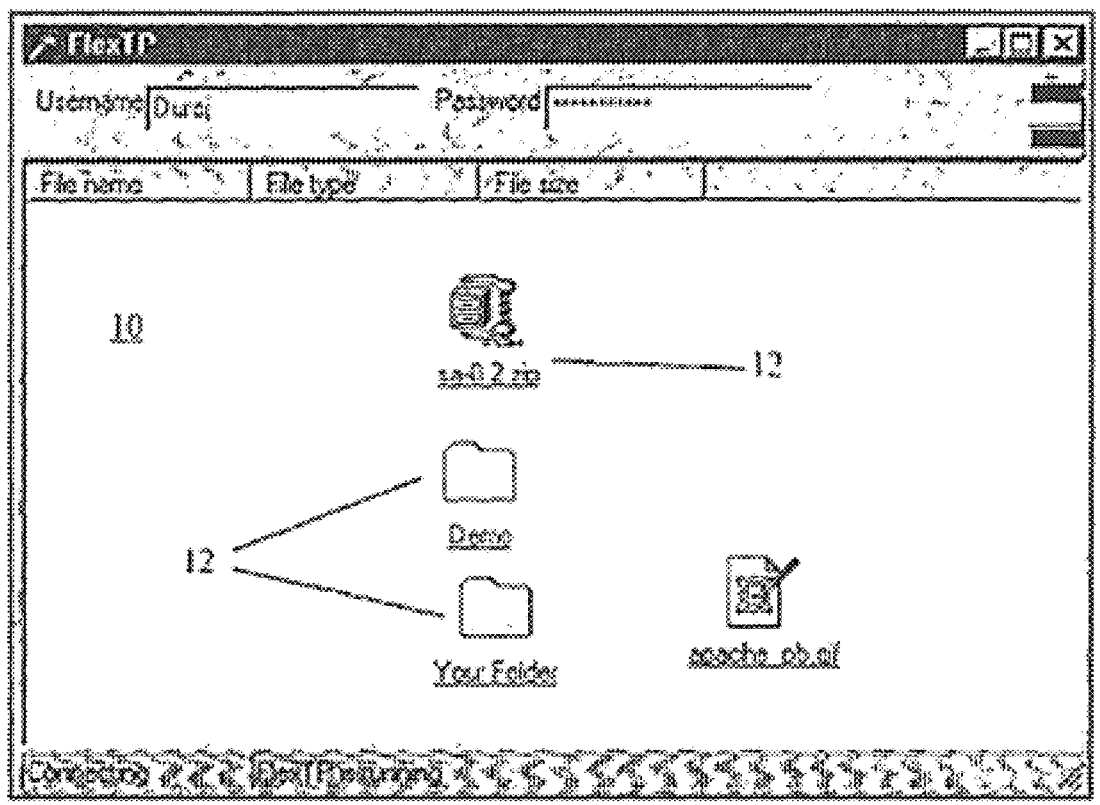
FIG. 1 illustrates a window comprising files on a card in accordance with the present invention.

Attached FIG. 1 illustrates a framed window 10 on a card comprising files in accordance with the present invention. The window is made automatically visible on a computer screen through software used to produce graphics when the card has been activated on a computer or terminal, and a user has instant access to his/her virtual hard disc space. A user is thus able to manipulate files in a temporary memory area connected to the host computer or terminal in use. When having updated a file it can be stored in the virtual hard disc memory space belonging to the user or owner of the card, and data produced in the temporary memory space is automatically deleted during log-out.

Files are in one embodiment of the invention saved in the window through drop and drag, which is illustrated through icons 12 in the window of FIG. 1.

Communication between the card and the virtual hard disc of the present invention is accomplished through a File Transfer Protocol (FTP). FTP is a standard application for transfer of files between computers attached to Transmission Control Protocol/Internet (TCP/IP) networks, comprising the Internet, and a client/server application, such that a user runs a program on one computer system, the client, which communicates with a program running on another computer system, the server. FTP was approved as a memorandum by the Internet Architecture Board of the Internet Society.

Figure 2:
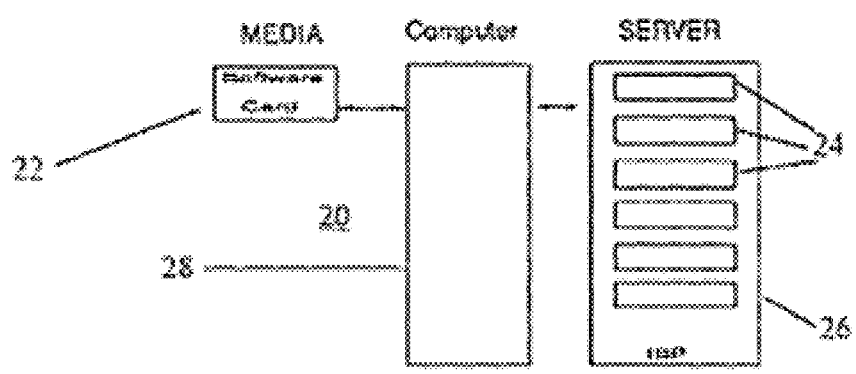
FIG. 2 illustrates a system with a virtual hard disc according to the present invention.

FIG. 2 illustrates a system 20 with virtual hard discs according to the present invention. The system 20 comprises a handheld portable card 22 interface to a crash secure virtual hard disc 24 accessed through the card 22 with software storage capability. In a preferred embodiment the system 20 comprises a hard coded address domain server in a network for data and telecommunication, such as Internet, Intranet or the like. By hard coded is meant that it follows the card 22 connected to the server 26.

A virtual hard disc is accomplished by dividing/partitioning server memory space into a plurality of virtual hard disc 24 spaces in a server 26. FTP is used as a file transfer protocol for copying files between card and a space in the virtual hard disc 24 or vice versa. Furthermore, the system 20 comprises that the card 22 has a graphical software representation, window, of files stored in the virtual hard disc. When activating an icon 12 FTP transfers the file linked to the icon to the computer 28 or terminal a user is working on at the time, and the file can be processed in a temporary memory space in the computer 28 or terminal. Hereby it is provided that the card 22 thus makes up a stationary user unchangeable portable hard disc 24, being crash secure through server 26 backup routines.

The system 20 virtual hard disc 24 is linked to a user or owner of the card by a useridentity and a password entered through the card 22 providing access to one specific hard disc 24 of the plurality of hard disc 24 memory spaces. The card provides that it can run on any computer 28 or terminal with transparent/comparable software.

It is appreciated that the present invention can provide multiple domain servers 26 each one connected with its own specific domain address, whereby each server provides multiple virtual hard disc 24 space.

To be able to log in to a virtual hard disc the present invention provides a handheld portable card 22 interface to a crash secure virtual hard disc accessed through the card with software storage capability. The card thus comprises a connection to one hard coded address domain server 26 in a network for data and telecommunication whereby the domain server 26 provides a plurality of virtual hard 24 disc spaces. Communication between the card 22 and server 26 is accomplished through a file transfer protocol for copying files between card and a space in the virtual hard disc or vice versa. The card 22 comprises graphical software, e.g., a browser, contact center, IT-support, e-support/services, and representation of files, icons 12, stored in the virtual hard disc 24.

Figure 3:
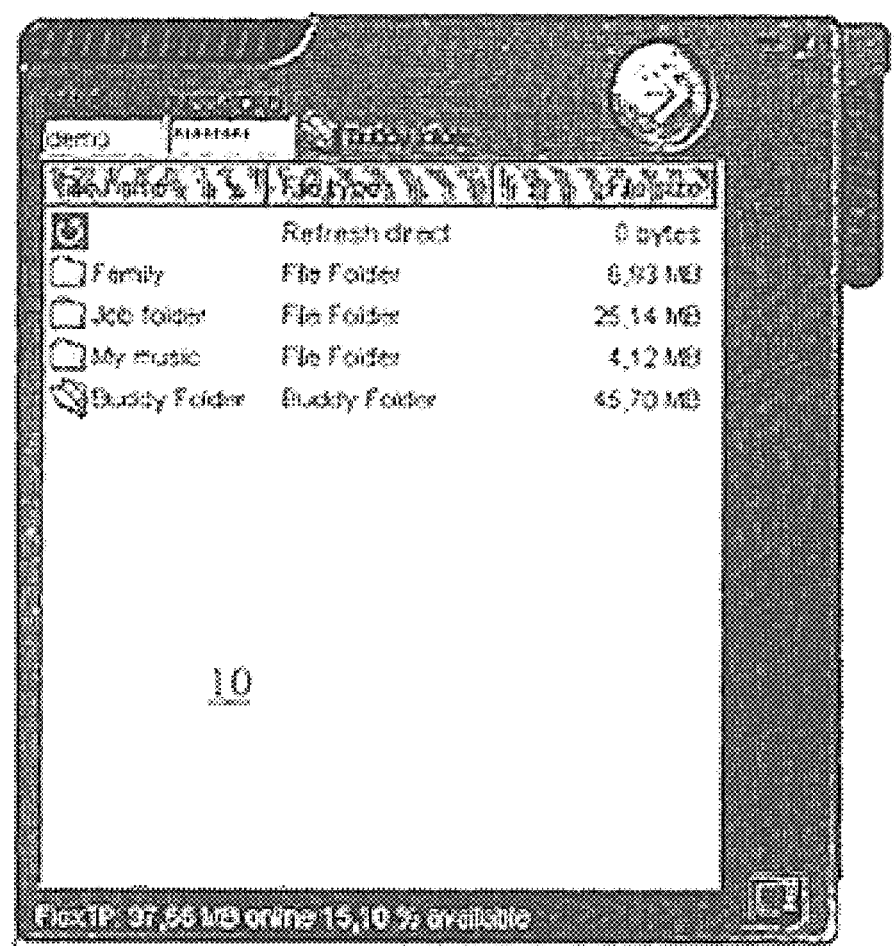
FIG. 3 illustrates an example of a designed virtual hard disc product in accordance with the present invention.

FIG. 3 illustrates an example of a designed virtual hard disc product for the current market in accordance with the present invention.

Figure 4:
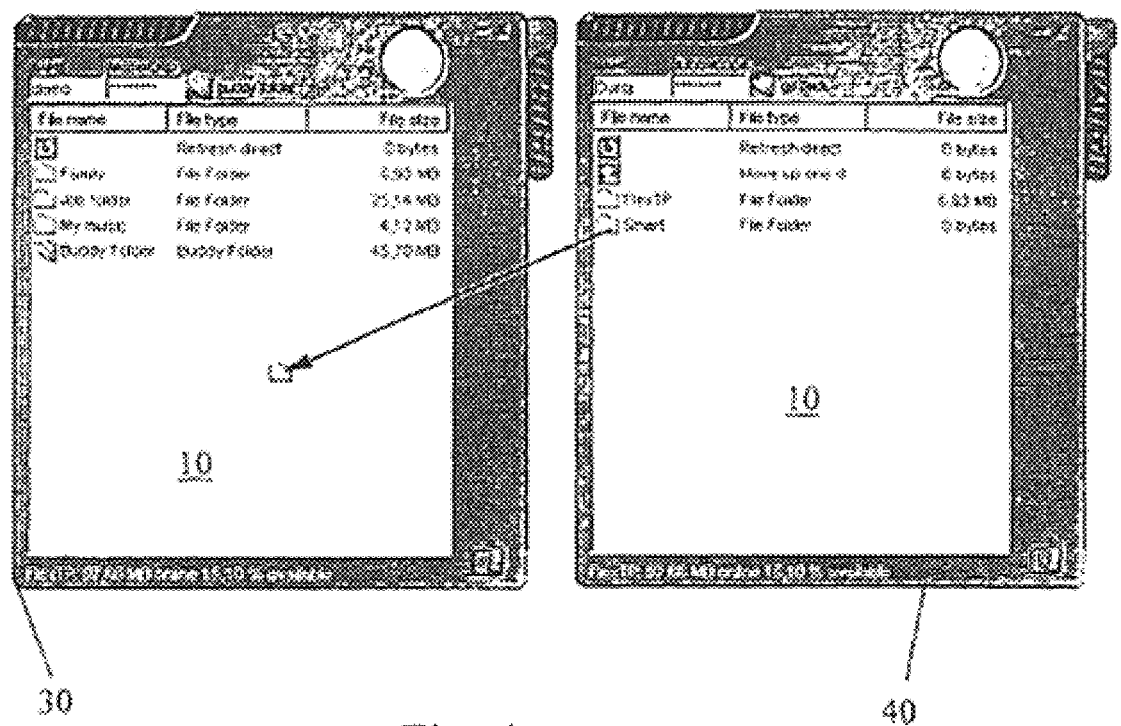
FIG. 4 illustrates sharing through duplicated virtual hard discs in accordance with the present invention.

One embodiment of the present invention, as depicted in FIG. 4, provides a virtual hard disc sharing through duplicated (FIG. 4; 30, 40), triplicate etc hard discs belonging to partners or the like in the window 10. Hereby a user can copy, paste, drag-and-drop etc. freely between those hard discs with a speed corresponding to internal hard disc storage or retrieval of data for one hard disc comprised in a PC, such as the C:/ disc. How this is accomplished is further elucidated below relating to copy speeds.

In one embodiment of the present invention it is possible to distribute to other virtual hard discs spaces through a server copy commando from any computer situated at an arbitrary location. This is possible to accomplish in a real hard disc speed due to that the spaces are situated on the same server. Currently this is accomplished through network copying, i.e., hard discs being situated apart on remote computers, thus copying most be accomplished through network transmission. According to the present invention a copy operation between virtual hard discs is made in speeds of internal copying in a single hard disc, for example, 1 gigabyte in three seconds, compared to copying via a network such as Internet which speed varies with the current traffic situation. Hence, the present virtual hard disc accomplishes a secure copy operation between hard discs on one and the same server, which makes it hard to tamper with the copy operation from outside the server environment.

In FIG. 4 a folder named "smart" is drop-and-dragged from a hard disc 40 to another hard disc 30. The hard disc 40 appears on the computer 28 screen when, for example, the folder "Buddy" is opened (clicked on). It is of course assumed that a user of hard disc 30 has been provided a password (buddycode in FIG. 4) to enter the hard disc 40 contained in the Buddy folder which gives the user access to a limited part of the hard disc 40 in accordance with the password. This file transfer is instantly accomplished in the server 26 through a server 26 internal operation, i.e., not through the network. It is ordered through the FTP, but the updating of hard disc 30 is a server 26 internal operation. Hence, achieving a very highspeed memory transfer between two hard discs 30, 40.

The present invention is not limited to examples and embodiments given in the present description. Its attached set of claims describes further embodiments to a person skilled in the art.

What is claimed is:

1. A virtual hard disc (24) interface on a handheld portable card or disc (22), being crash secured and accessed through said card or disc (22) with software storage capability, comprising:
   a connection to one hard coded address domain server (26) in a network for data and telecommunication;
   said domain server (26) providing a plurality of virtual hard disc (24) spaces;
   said domain server and one of said plurality of hard discs being reached from any host computer (28) or terminal with a corresponding card or disc receiver through said hard coded address, whereby the card or disc (22) provides a user personal hard disc to an arbitrary computer (28) or terminal;
   a file transfer protocol for copying or retrieving files between card or disc and a space in said virtual hard disc (24) or vice versa;
   a graphical (12) software representation of tiles in said virtual hard disc (24) on said card or disc (22); and
   thereby providing said card or disc (22) having only one access path to said one domain server (26), thus providing a stationary user unchangeable portable hard disc interface, being crash secure.

2. A virtual hard disc (24) interface according to claim 1; wherein a useridentity and a password entered through said card or disc (22) provides access to one of said plurality of hard disc spaces.

3. A virtual hard disc (24) interface according to claim 1, wherein drag and drop 25 is used for adding files to said card or disc graphics.

4. A virtual hard disc (24) interface according to claim 1, wherein said card or disc provides that it can run on any computer or terminal with transparent software.

5. A virtual hard disc (24) interface according to claim 2, wherein the space is made available to a user through drop and drag an icon/graphics onto the card or disc as a useridentity and password, whereby the icon/graphics pixels are matched to stored pixels on the card or disc for the graphic shown in the icon.

6. A virtual hard disc (24) interface according to claim 1 wherein a data transfer between two hard discs (24) is provided in high-speed through a server (26) internal transfer.

7. A system (20) comprising a handheld portable card or disc (22) with an interface to a crash secure virtual hard disc (24) accessed through said card or disc (22) with software storage capability, comprising:
   a hard coded address domain server in a network for data and telecommunication;
   a plurality of virtual hard disc (24) spaces in said server;
   said domain server and one of said plurality of hard discs being reached from any host computer (28) or terminal with a corresponding card or disc receiver through said hard coded address, whereby the card or disc (22) provides a user personal hard disc to an arbitrary computer (28) or terminal;
   a file transfer protocol for copying or retrieving tiles between card or disc (22) and a space in said virtual hard disc (24) or vice versa;
   a graphical (12) software representation of files in said virtual hard disc on said card or disc;
   a temporary memory space in a host computer (28) or terminal running the card or disc for processing said files;
   and thereby providing said card or disc having only one access path to said one domain server, and thus comprising stationary user unchangeable portable hard disc (24) interfaces, being crash secure.

8. A system (20) comprising a virtual hard disc (24) according to claim 7, wherein a user identity and a password entered through said card or disc (22) provides access to one of said plurality of hard disc spaces.

9. A system (20) comprising a virtual hard disc according to claim 7, wherein drag and drop is used for adding files to said card or disc graphics (12).

10. A system (20) comprising a virtual hard disc (24) according to claim 7, wherein said card or disc provides that it can run on any computer (28) or terminal with transparent software.

11. A system (20) comprising a virtual hard disc (24) according to claim 8, wherein the space is made available to a user through drop and drag an icon/graphics onto the card or disc as a useridentity and password, whereby the icon/graphics pixels are matched to stored pixels on the card or disc for the graphic shown in the icon.

12. A system (20) comprising a virtual hard disc (24) according to claim 7, wherein a data transfer between two hard discs (24) is provided in high-speed through a server (26) internal transfer.

* * * * *

UNITED STATES PATENT AND TRADEMARK OFFICE
CERTIFICATE OF CORRECTION

PATENT NO. : 6,804,702 B2 Page 1 of 1
DATED : October 12, 2004
INVENTOR(S) : Dan Duroj It is certified that error appears in the above-identified patent and that said Letters Patent is hereby corrected as shown below:

<u>Title page,</u>
Item [75], Inventor, should read -- Dan Duroj --

Signed and Sealed this

Fifth Day of July, 2005

JON W. DUDAS
*Director of the United States Patent and Trademark Office*